A. R. TUTTLE.
WHIP SOCKET.
APPLICATION FILED DEC. 12, 1908.
933,140.
Patented Sept. 7, 1909.
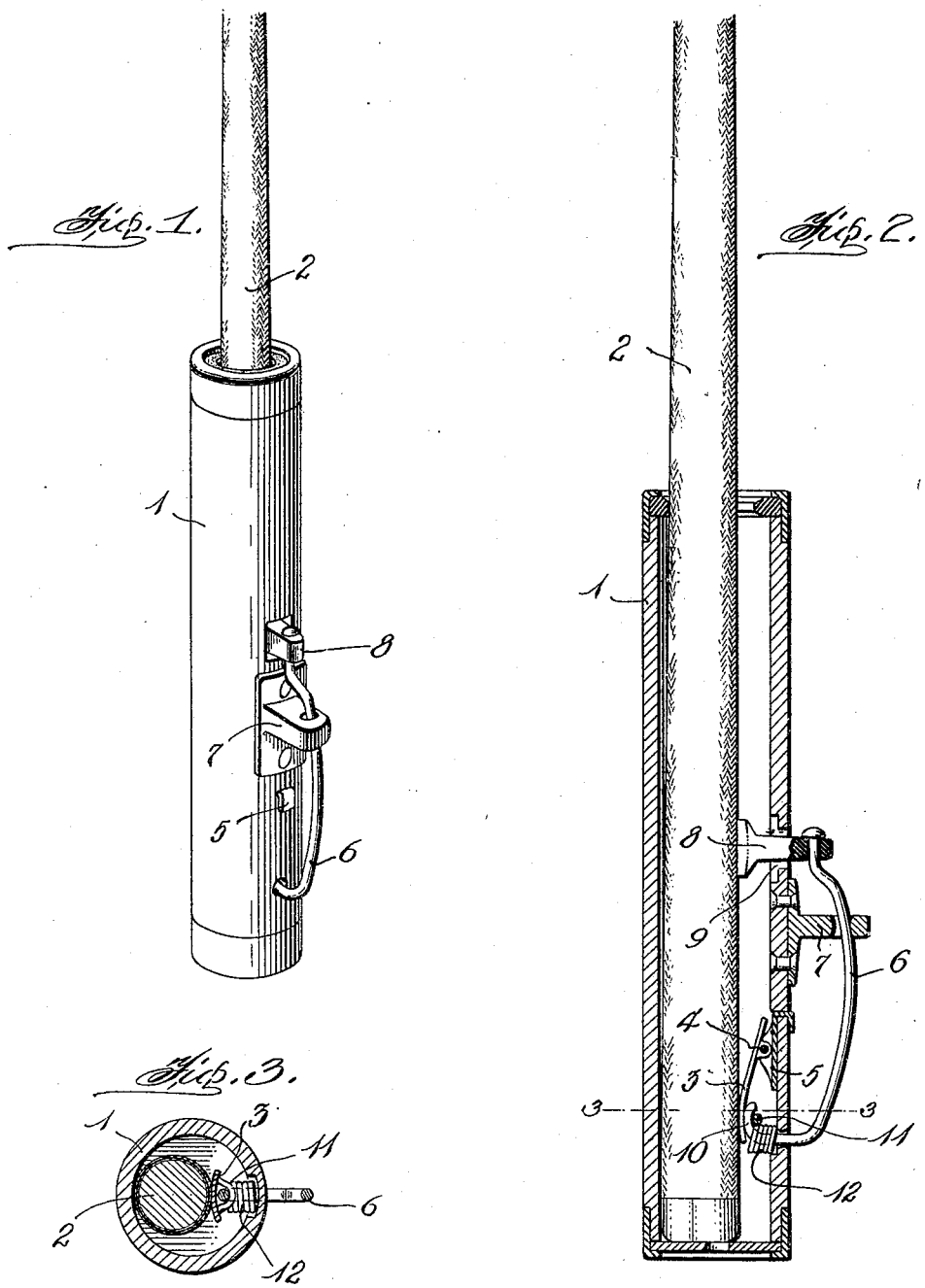
Witnesses
Olin W. Holmes
S. E. Dodge
Inventor
A. R. Tuttle,
By Beeler & Robb
Attorneys

UNITED STATES PATENT OFFICE.

ARTHUR ROY TUTTLE, OF STERLING, NEBRASKA.

WHIP-SOCKET.

933,140.  Specification of Letters Patent.  Patented Sept. 7, 1909.

Application filed December 12, 1908. Serial No. 467,249.

*To all whom it may concern:*

Be it known that I, ARTHUR ROY TUTTLE, a citizen of the United States, residing at Sterling, in the county of Johnson and State of Nebraska, have invented certain new and useful Improvements in Whip-Sockets, of which the following is a specification.

This invention embodies certain novel improvements in whip sockets and resides chiefly in the provision of a peculiar form of friction device which is automatically operable to engage and hold the whip, as the butt of the latter is introduced into the socket.

For a full understanding of the invention, reference is to be had to the following detail description and to the accompanying drawings, in which—

Figure 1 is a perspective view of a whip socket embodying the invention; Fig. 2 is a vertical sectional view bringing out more clearly the parts of the mechanism comprising the invention, and Fig. 3 is a cross section on the line 3—3 of Fig. 2.

Throughout the following detail description and on the several figures of the drawings similar parts are referred to by like reference characters.

It is contemplated that the whip socket 1 may be provided with any suitable attaching means for securing the same to a vehicle. The whip 2 is adapted to be disposed in the socket 1 in the customary way. In order, however, to prevent accidental displacement of the whip 2 from the socket it is contemplated to provide holding means carried by the socket 1 and adapted to directly engage the butt of the whip 2 for the above purpose.

The holding means before referred to comprises a pressure plate 3 the upper end of which is pivoted to the socket 1 as shown at 4, and the plate 5 having suitable pivot ears being secured to the wall of the socket to form a pivotal support for said plate 3. The lower end of the plate 3 is movable and is connected with a lever spring 6 the body portion of which is arranged exterior to the socket 1. The member 6, intermediate of its ends, passes through a bracket 7 attached to or otherwise carried by the socket 1 on the outside thereof. Secured to the upper end of the member 6 is a friction shoe 8 the inner portion of which is adapted to engage the butt of the whip 2 when the latter is received by the socket 1, and the outer portion of which passes through an opening 9 in a side of the socket so as to permit of attachment thereof to the member 6 aforesaid. At its lower end the lever spring 6 is bent laterally so as to pass through an opening near the bottom of the socket 1 and is formed with a hook 10 passing through a loop 11 on the inner side of the lower end portion of the pressure plate 3. A coiled spring 12 surrounds the lower portion of the member 6 and is interposed between the hook 10 and the adjacent inner wall of the socket 1.

Under normal conditions when the whip 2 is not carried within the socket 1, the spring 12 holds the pressure plate 3 in a position near the central portion of the socket 1 and inclining outwardly toward its lower end with respect to its pivotal support 5. Under such conditions the shoe 8 is at the outermost adjustment thereof so as not to interfere with the introduction of the whip 2 into the socket. On placing the butt of the whip 2 in the socket 1 and moving it downwardly in the customary way, this portion of the whip by engaging the plate 3 forces the lower portion of said plate toward the inner wall of the socket 1, and thereby the member 6 is given a partial pivotal movement with respect to the bracket 7 causing the shoe 8 to engage the whip and by frictional contact prevent displacement of said article from the socket. Of course when sufficient force is exerted the whip 2 may be readily pulled upwardly out of the socket 1, notwithstanding the frictional engagement therewith by the shoe 8, the lever spring 6 permitting the withdrawal of the whip in an evident manner.

Having thus described the invention, what is claimed as new is:

1. In combination, a whip socket, and whip holding means applied to said socket, said holding means comprising a pressure plate in the socket engageable by a whip when introduced into the socket, a friction shoe movable into the socket to engage the whip, and a lever spring outside of the socket and connected between its ends thereto, said lever spring having connection at its opposite ends with the pressure plate and friction shoe for the purpose described.

2. In combination, a whip socket, and whip holding means therefor comprising a pressure plate pivoted in the socket at its lower portion, a frictional shoe movable toward and from the inner wall of the socket and mounted above said pressure plate, a bracket projecting from the socket, a lever spring outside of the socket and having its upper end connected with the friction shoe and having its lower end pivotally connected with the pressure plate, whereby when the pressure plate is engaged by a whip received in the socket the friction shoe will be caused to engage said whip, and spring means coacting with the lever spring to hold the friction shoe normally out of operative position.

3. In combination, a whip socket, and whip holding means therefor comprising a bracket projecting outwardly from the socket, a lever spring, the intermediate portion of which passes through said bracket, a friction shoe connected with the upper end of the lever spring and movable to engage a whip in the socket, a pressure plate pivoted at its upper end within the lower portion of the socket and having a loop at its lower end, the lower end of the lever spring being bent laterally so as to pass into the socket and thence being bent to form a hook engaging a loop in the pressure plate, whereby when the pressure plate is engaged by a whip the lever spring will force the friction shoe against the whip, and a spring mounted on the lower portion of the lever spring between the pressure plate and adjacent wall of the socket to normally hold the friction shoe out of operative position.

In testimony whereof I affix my signature in presence of two witnesses.

ARTHUR ROY TUTTLE.

Witnesses:
 ANSEL TUTTLE,
 WILL A. BORLAND.